(12) United States Patent
Nadeau (10) Patent No.: US 9,856,002 B1
(45) Date of Patent: Jan. 2, 2018

(54) WATERCRAFT WITH MINIMAL WATER DISPLACEMENT

(71) Applicant: Gilles Nadeau, St-Roch-de-Richelieu (CA)

(72) Inventor: Gilles Nadeau, St-Roch-de-Richelieu (CA)

(73) Assignee: Gilles Nadeau, Saint-Roch-de-Richelieu (CA)

( * ) Notice: Subject to any disclaimer, the term of this patent is extended or adjusted under 35 U.S.C. 154(b) by 0 days.

(21) Appl. No.: 15/497,381

(22) Filed: Apr. 26, 2017

(51) Int. Cl.
*B63H 1/38* (2006.01)
*B63H 5/02* (2006.01)
*B63B 3/14* (2006.01)
*B63H 23/06* (2006.01)

(52) U.S. Cl.
CPC ............... *B63H 1/38* (2013.01); *B63B 3/14* (2013.01); *B63H 5/02* (2013.01); *B63H 23/06* (2013.01); *B63B 2743/00* (2013.01); *B63B 2745/04* (2013.01); *Y02T 70/121* (2013.01)

(58) Field of Classification Search
CPC ... B63B 3/14; B63B 2743/00; B63B 2745/04; B63H 1/38; B63H 5/02; B63H 2005/025; B63H 23/06
USPC .................................. 440/98–100
See application file for complete search history.

(56) References Cited

U.S. PATENT DOCUMENTS

| | | | | |
|---|---|---|---|---|
| 897,517 A * | 9/1908 | Blake | ........................ | B63H 1/38 |
| | | | | 440/100 |
| 1,258,428 A * | 3/1918 | Marling | .................... | B63B 1/38 |
| | | | | 114/67 R |
| 1,380,296 A * | 5/1921 | Hill | ........................... | B63H 1/38 |
| | | | | 114/163 |
| 1,749,276 A * | 3/1930 | Edmonds | .............. | B60F 3/0015 |
| | | | | 180/9.1 |
| 1,924,949 A * | 8/1933 | Lombardini | .............. | B63B 1/36 |
| | | | | 440/100 |
| 2,823,637 A * | 2/1958 | Cheramie | ............... | B60B 19/06 |
| | | | | 152/209.12 |
| 2,907,296 A | 10/1959 | Roby | | |
| 2,910,035 A | 10/1959 | Johnson | | |
| 3,335,692 A * | 8/1967 | Wright | .................... | B63H 1/38 |
| | | | | 440/100 |
| 5,265,827 A | 11/1993 | Gerhardt | | |
| 6,083,062 A | 7/2000 | Treloar et al. | | |
| 6,083,065 A | 7/2000 | Hall | | |
| 6,743,064 B2 | 6/2004 | Gieseke | | |
| 7,090,553 B1 | 8/2006 | Selford, Sr. | | |
| 8,142,167 B2 | 3/2012 | Vitale | | |
| 8,277,267 B1 | 10/2012 | Chippas | | |
| 8,668,535 B1 | 3/2014 | Scroggs | | |
| 8,721,378 B2 | 3/2014 | Da Silva | | |
| 2006/0178059 A1 | 8/2006 | Metheny et al. | | |

* cited by examiner

*Primary Examiner* — Ajay Vasudeva
(74) *Attorney, Agent, or Firm* — IP Delta Plus Inc.

(57) ABSTRACT

The present watercraft comprises a hull, and a flotation structure. The hull has a length overall and a beam. The flotation structure protrudes under the hull. The flotation structure supports a plurality of buoyant toothed rollers. Each buoyant toothed roller is substantially parallel to a beam of the hull. Each buoyant toothed roller is also rotationally retained by the flotation structure.

9 Claims, 10 Drawing Sheets

WATERCRAFT WITH MINIMAL WATER DISPLACEMENT

TECHNICAL FIELD

The present disclosure relates to watercrafts, and more particularly to a watercraft with minimal water displacement.

BACKGROUND

Small watercrafts are efficient means of transportation to transit and travel across lakes and rivers. Watercrafts are characterized by their length, beam, draft and power. Draft corresponds to the minimal water depth required to prevent hitting bottom. On most watercrafts, the lowermost component is the propeller of the motor. The propeller is thus the component most exposed to rocks, riverbeds, shores and debris.

But the propeller is not the only component which can be damaged. River banks and riverbeds are often covered with rocks and debris, and users of small watercrafts often navigate as close as possible to shore, to prevent or reduce wetness when getting in or out of the watercraft. Oftentimes, when approaching shore, the user of a small watercraft will lift the propeller to prevent damaging the latter. When the propeller is lifted, the lowermost component of the small watercraft is the hull, which is pushed or dragged close to or directly on shore. Hulls are usually designed to support slow dragging against rocks, sand and debris. But hulls are not designed to allow fast pushing against rocks, sand and debris, which is often caused by an approach at too high speed to get closer to shore, and usually results in damages.

There is therefore a need for a new type of watercraft with minimal water displacement, to alleviate the problems related to current boats.

SUMMARY

According to a first aspect, the present disclosure relates to a watercraft comprising:
a hull; and
a flotation structure protruding under the hull, the flotation structure retaining a plurality of buoyant toothed rollers, each buoyant toothed roller being substantially parallel to a beam of the hull and being rotationally retained by the flotation structure.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only, in reference to the accompanying drawings. Like numerals represent like features on the various drawings.

Various aspects of the present disclosure generally address watercrafts. More particularly, the present disclosure relates to watercrafts with minimal water displacement The following terminology is used throughout the present disclosure:

watercraft: a boat or any other type of vessel that travels on water;

roller: a generally cylindrical member that rotates around a central axis;

toothed roller: a roller with projections along its circumference to engage with water; and water displacement: volume of water that is displaced by a watercraft.

The present watercraft comprises a hull and a flotation structure. The flotation structure protrudes under at least a portion of the hull. The flotation structure retains a plurality of buoyant toothed rollers. Each buoyant toothed roller is substantially parallel to a beam of the hull, and is rotationally retained by the flotation structure. The resulting watercraft offers improved buoyancy, while reducing water displacement. Furthermore, the buoyant toothed rollers prevent hitting of the hull against rocks, sand, debris, etc.

Hulls come in different shapes and sizes, and the present watercraft adapts to flat hulls and shallow vee hulls, which are commonly used with inboard engines, outboard engines or water turbines. Examples of such hulls include: floating platforms, houseboats, vessels, ski boats, rescue boats, fishing boats, life boats, and any other type of hull which is partially submerged in water and is powered by an engine. The hull may be made of any known material adapted for marine applications, such as for example: fiberglass, aluminum, metal, plastic, wood, etc.

The flotation structure is affixed to the hull using any known method or materials to affix components submerged underwater to a hull, such as for example: welding, soldering, riveting, screwing, gluing, etc. Alternately, the hull may be built to include herein the flotation structure. The present watercraft may rely on one or several affixing materials and or components. The affixing materials and/or components may be affixed to the exterior of the hull, through the hull, or affixed inside the hull.

Longitudinal Section(s)

Depending on the size and shape of the hull, the present flotation structure may take various configurations. For clarity's sake, the configurations of the flotation structure will be described by referring to the concept of longitudinal section(s). Each longitudinal section of the flotation structure projects under a length of the hull. Depending on the type of hull, powering and marine conditions for which the watercraft is designed, one or several longitudinal sections may be used. For ease of installation, each longitudinal section may be divided into consecutive longitudinal sub-sections. The consecutive longitudinal sub-sections may be abutted to one another, or spaced apart. The length of each longitudinal section is measured between its outermost extremities. When the longitudinal section is composed of multiple consecutive sub-sections, the length of the resulting longitudinal section is measured from an outer extremity of a first sub-section to an outer extremity of the last sub-section forming the longitudinal section. The longitudinal sections may be contiguous, or separated by a gap. Furthermore, when the flotation structure comprises multiple longitudinal sections, lengths of the multiple longitudinal sections are balanced for stability purposes. For example, when two longitudinal sections are used, both longitudinal sections are the same length. When three longitudinal sections are used, the central longitudinal section may be shorter or longer than the longitudinal sections on each side thereof, which are of equal length. When four longitudinal sections are used, the two exterior longitudinal sections are of the same length, and the two longitudinal sections there between may be of shorter or longer length that the exterior longitudinal sections but both being of the same length. For pitching stability purposes, positioning of the longitudinal sections located on the outermost part of the hull preferably do not extend beyond the hull, and preferably are positioned to extend over 90% of the length of the hull at waterline. Hence, the flotation structure preferably protrudes over at least 90% of the length of the hull at waterline.

Furthermore, to reduce rolling of the watercraft, the configuration of the flotation structure takes into consideration the beam of the hull. To that effect, the flotation structure's width preferably extends over at least 75% of the beam of the hull.

The longitudinal sections may form a single plane, or intersecting planes. However, when a longitudinal section is formed of multiple longitudinal sub-sections, the longitudinal sub-sections form together a single plane.

Each longitudinal section of the flotation structure rotationally retains a plurality of parallel buoyant toothed rollers either together or disposed as separate longitudinal sub-sections. The buoyant toothed rollers are retained by the flotation structure in such a manner that a length of each buoyant toothed roller is parallel to a beam of the hull. The buoyant toothed rollers may be retained by the flotation structure so as to be parallel to the hull under which they are retained by the flotation structure. Alternatively, the buoyant toothed rollers may be retained by the flotation structure at a slight angle to the hull under which they are retained by the flotation structure, the angle preferably not exceeding 5°. The buoyant toothed rollers may rotate freely, or at least some of the buoyant toothed rollers of the outer longitudinal sections may be interlinked.

The number of buoyant toothed rollers on each longitudinal section depends on various factors: buoyancy of the toothed rollers, expected total weight of the watercraft (with engine, passengers, equipment, fuel, . . . ), size of the toothed rollers, size of the watercraft, etc. However, based on the tests performed, it has been established that a minimum of 15 buoyant toothed rollers is required to reduce the water displacement while providing sufficient stability.

Buoyant Toothed Roller

Reference is now made to FIGS. 1-5, which illustrate different views of an exemplary buoyant toothed roller 10. The buoyant toothed roller 10 is shaped as a cylinder, with two opposite extremities 12 and 14, and a height defined between the two opposite extremities 12 and 14. Teeth 16 outwardly project away along the cylinder between the two opposite extremities 12 and 14. The teeth 16 are shown as being linearly continuously projecting along the cylinder, but the present buoyant toothed roller is not limited to such an implementation. For example, the teeth 16 can be projecting rectilinearly or curvilinearly along the length of the cylinder. Furthermore, the teeth 16 can be projecting rectilinearly or curvilinearly along the cylinder where each radial projection is one continuous longitudinal tooth, or the teeth 16 can be projecting rectilinearly or curvilinearly along the length of the cylinder and each radially projecting rectilinearly or curvilinearly is composed of a series of adjacent sub-teeth forming the teeth. Alternatively, the teeth 16 can be projecting rectilinearly or curvilinearly along the length of the cylinder as a composition of continuous teeth and series of adjacent sub-teeth. For simplicity purposes, FIGS. 1-5 only show the implementation where the teeth 16 are projecting rectilinearly along the length of the cylinder of the buoyant toothed roller 10.

Figure 1:
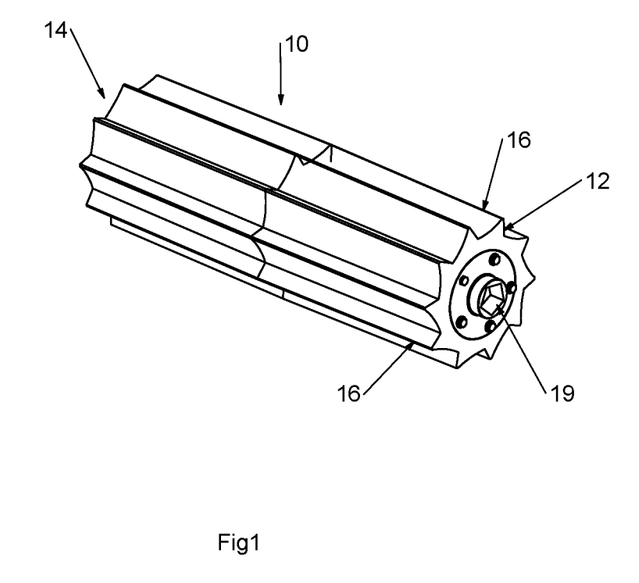
FIG. 1 is a perspective view of an exemplary buoyant toothed roller.
Figure 2:
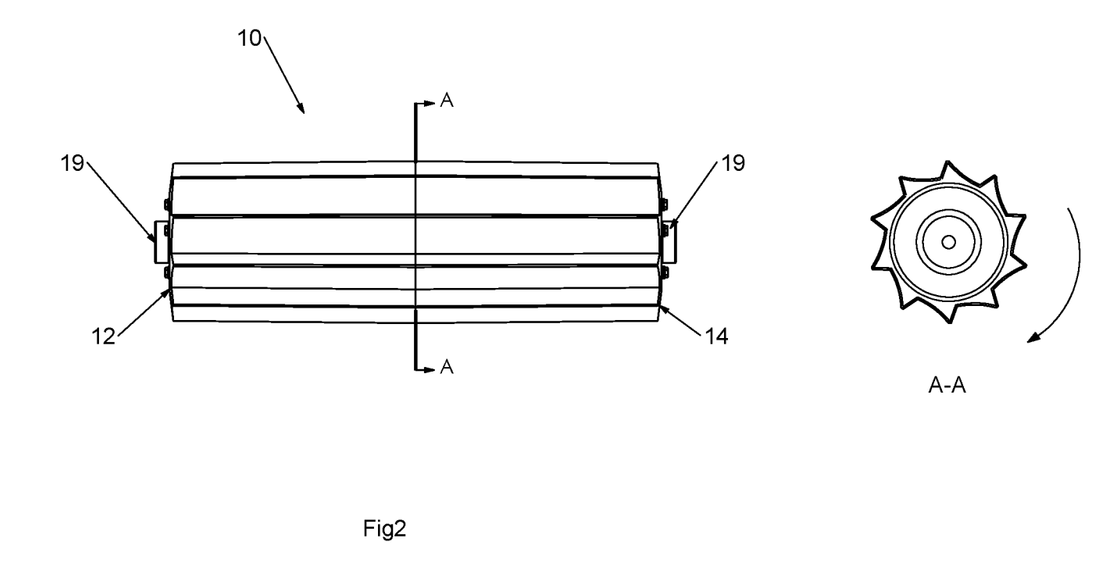
FIG. 2 is a side elevation view of the exemplary buoyant toothed roller.
Figure 3:
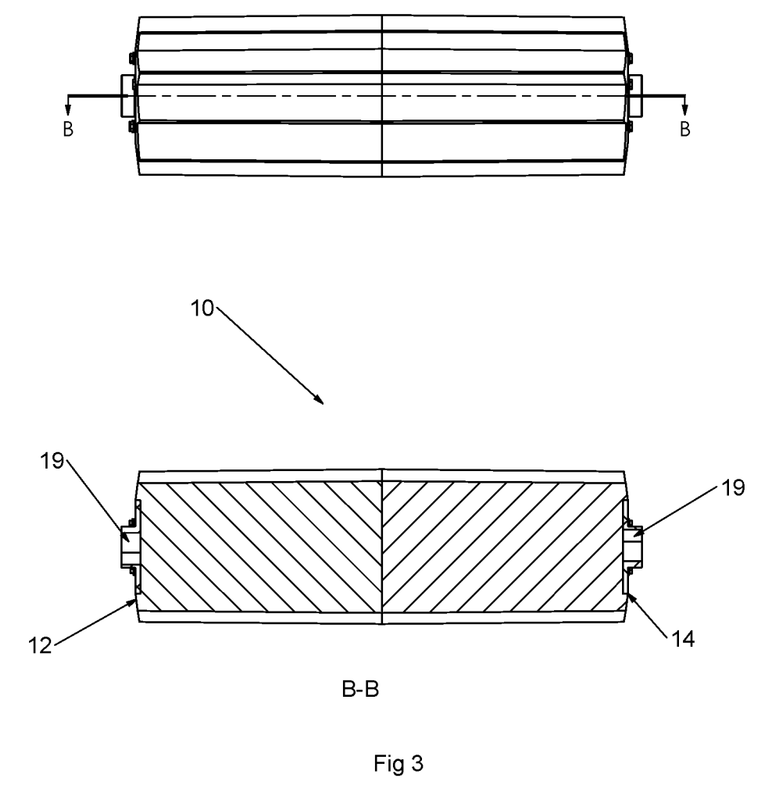
FIG. 3 is a cross-sectional view of the exemplary buoyant toothed roller of FIG. 2, along the B-B line.
Figure 4:
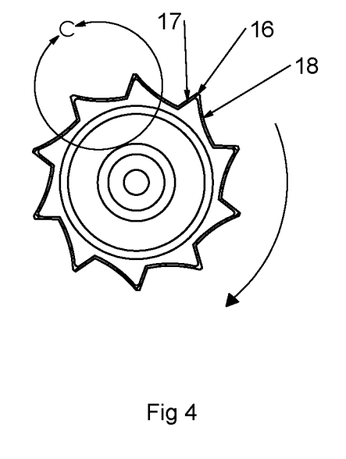
FIG. 4 is a cross-sectional view of the exemplary buoyant toothed roller of FIG. 2, along the A-A line.
Figure 5:
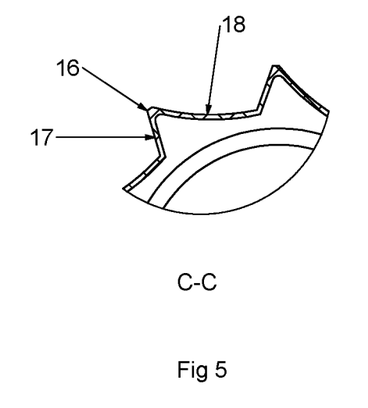
FIG. 5 is a partial exploded view along the line C of the exemplary buoyant toothed roller of FIG. 4.

Referring now more precisely to FIGS. 4 and 5, where an exemplary geometry of the teeth 16 is depicted. FIGS. 4 and 5 only represent an example of geometry of teeth 16, and the present description will describe alternatives and discuss the particularities of the geometry. As shown on FIGS. 4 and 5, a first particularity of the teeth 16 is to be asymmetric along a circumference of the cylinder of the buoyant toothed roller. A second particularity of the teeth 16 is that each tooth 16 is composed of a rise 17 and a fall 18, and the rise 17 is shorter than the fall 18. Of course, the proportions of the buoyant toothed roller 10 shown on FIGS. 4 and 5 are for example only, as many other proportions and teeth size, length of rise and length of fall could alternately be used. Consecutive teeth 16 along the circumference of the buoyant toothed roller 10 may be identical or shaped differently. The rise 17 and the fall 18 may be rectilinear or curvilinear. On the example shown on FIGS. 4 and 5, the fall 18 of the teeth 16 is inwardly curved towards the circumference of the buoyant toothed roller. Alternatively, the rise 17 could be concave while the fall 18 could be convex.

Figure 6:
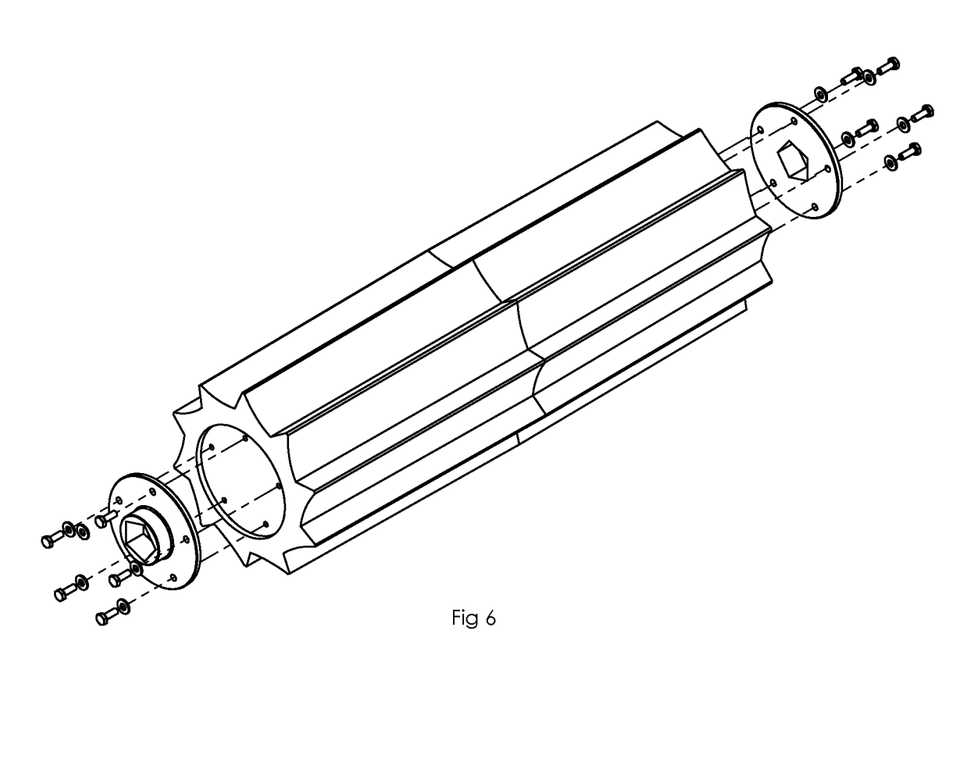
FIG. 6 is a perspective exploded view of the exemplary buoyant toothed roller, with an exemplary affixing mechanism.
Figure 7:
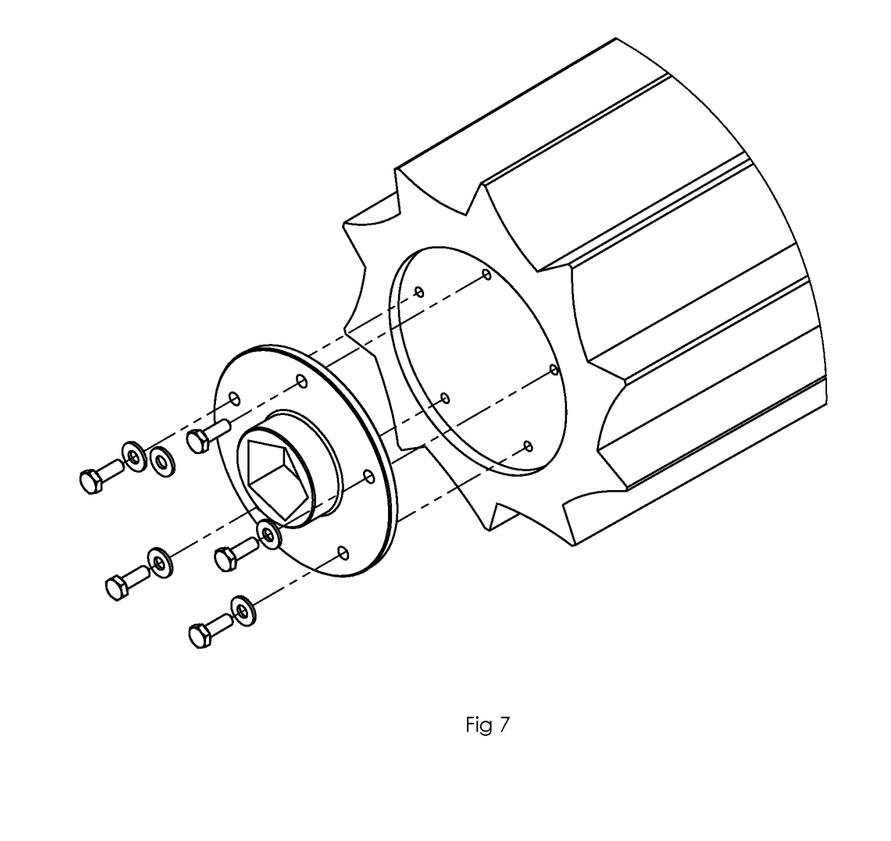
FIG. 7 is an enlarged perspective exploded view of the exemplary buoyant toothed roller of FIG. 6, along the A line.

The buoyant toothed roller 10 further includes an engagement 19. The engagement 19 shown on FIGS. 1-4 is a pair of engaging projections located on extremities 12 and 14 of the buoyant toothed roller 10. Each engaging projection comprises an engaging mechanism therein, adapted to receive a corresponding support 20 (shown on FIG. 8). The engagement 19 may be molded directly with the buoyant toothed roller, or affixed to as shown on FIGS. 6 and 7.

In an alternative not shown on the Figures, the engagement 19 could consist of a longitudinal aperture defined through the buoyant toothed roller 10. The shape of the longitudinal aperture near the extremities 12 and 14 or all through the length of the buoyant toothed roller 10 would match the shape and size of the support 20 to fixedly mate therewith.

In another alternative, the engagement 19 could be a male adaptor and the support 20 a female adaptor, where the shape and size of the male adaptor of the engagement 19 and the female adaptor of the support 20 match to fixedly mate.

Additionally, the engagement 19 at the extremity 12 of the buoyant toothed roller 10 may be different from the engagement 19 at the extremity 14 of the buoyant toothed roller 10.

The mating mechanism 21 and support 20 shown on the Figures is shaped as a pentagon. However, the mating mechanism 21 and support 20 could have any shape that allows mating there between while preventing slippage. For example, the mating mechanism 21 and support 20 could be shaped as any of the following: a triangle, a square, a rectangle, a hexagon, an heptagon, an octagon, a circle with radially projecting teeth, a circle with curvilinearly projecting teeth, or any other known complimentary shapes used to mate male and female components.

The buoyant toothed roller 10 may be made of any material that provides buoyancy. The buoyant toothed roller 10 may be made of a material that is rigid or semi-rigid. The buoyant toothed roller 10 may be full or hollow, depending on the conditions in which the buoyant toothed roller 10 will be used.

Although shown as a long cylinder on FIG. 1-8, the buoyant toothed roller 10 is not limited to such proportions. For example, the buoyant toothed roller 10 could be shorter or longer, and defining a smaller or larger diameter. Furthermore, the shape and proportions of the teeth 16 and the engagement 19 could vary without departing the scope of the present description. Furthermore, the buoyant toothed roller 10 may have a slightly larger diameter at its extremities and a slightly smaller diameter at its center, so as to facilitate molding and improve rigidity of its extremities without impact its overall weight.

When installed on the flotation structure, the buoyant toothed rollers 10 are installed to rotate in a direction where the fall 18 of each tooth 16 is presented before the corresponding rise 17. For example, by referring to FIGS. 4 and 5, the buoyant toothed roller 10 rotates in clockwise direction when the watercraft is moving forward. Presenting the fall 18 before the rise 17 of each tooth 16 serves two purposes: first a surface of buoyancy provided by each tooth 16 is presented, and traction is provided in second by the junction of the fall 18 with the rise 17 rotating in the water. The sequence of presenting the fall 18 followed by presenting the rise 17 of each tooth 16 increases buoyancy, thereby reducing water displacement.

Mating Mechanism and Support

Figure 8:
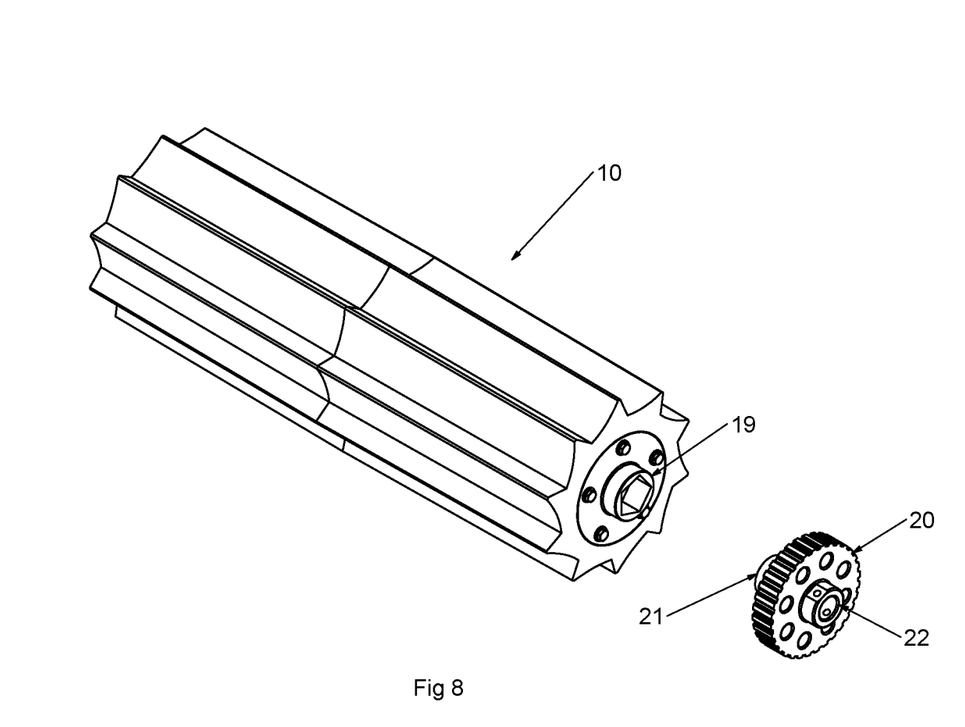
FIG. 8 is a perspective exploded view of the exemplary buoyant toothed roller of FIG. 1, with a support with a male mating mechanism.
Figure 10:
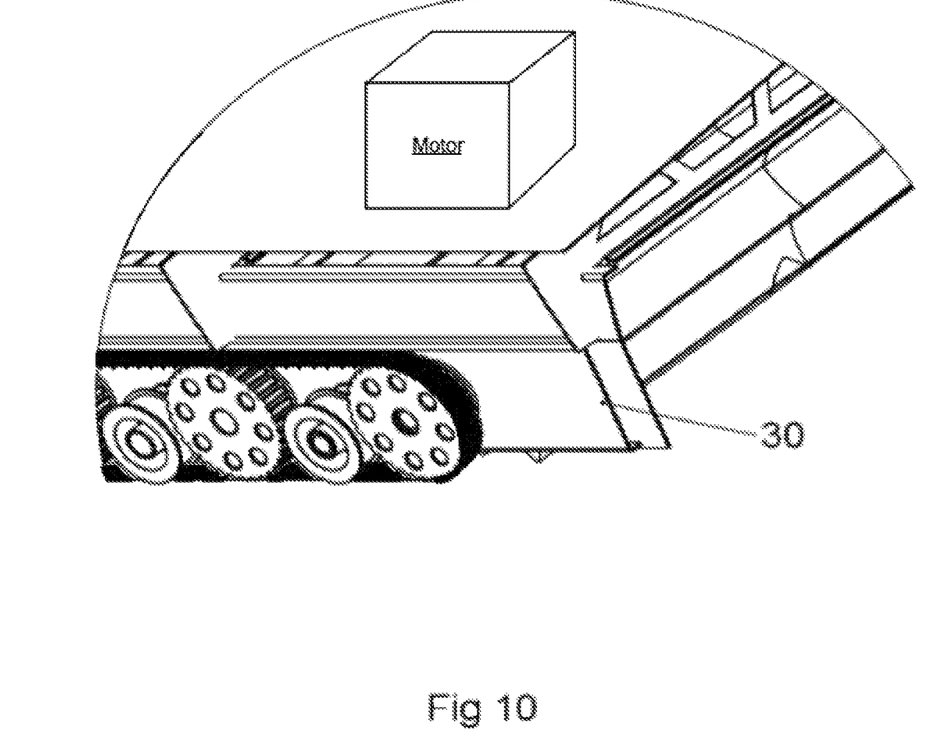
FIG. 10 is an enlarged perspective view of area Z on FIG. 9.

Reference is now made to FIG. 8 which is a perspective exploded view of the exemplary buoyant toothed roller 10, with an exemplary mating mechanism 21 and support 20, and concurrently to FIG. 10 which is an enlarged perspective view of area Z of flotation structure affixed to a hull. The support 20 comprises the mating mechanism 21 to engage and mate with the engagement 19 of the buoyant toothed roller 10. The support 20 is further adapted for connecting the buoyant toothed roller 10 to the flotation structure 30. FIG. 12 shows an example for connecting the buoyant toothed roller 10 to the flotation structure 30. In this example, the support 20 is adapted for rotating within an aperture of the flotation structure 30, either with or without a bearing such as for example ball-bearing, roller-bearing, wheel-bearing, or any other type of rolling-element bearing known in the art.

The support 20 may allow the buoyant toothed roller 10 to rotate freely in the opening of the flotation structure 30, or to propel rotation of the buoyant toothed roller 10. When the buoyant toothed roller 10 is propelled, the support 20 may further comprise a gear wheel 22 as shown on FIG. 8. Alternatively, the support 20 may be adapted to receive a coupling rod for propelling the buoyant toothed roller 10, of any other type of mechanism adapted to propel rotation of the buoyant toothed roller 10 to which the support 20 is mated with.

The mating mechanism 20 could have different shapes and sizes, so to as securely mate with the engagement 19 of the buoyant toothed roller 10. The support 20 could have different shapes and sizes, depending on the shape and size of the mating mechanism 21 and the flotation structure 30 to which it is installed. The mating mechanism 21 and support 20 may be made of any material which is strong enough to mate with the buoyant toothed roller 10 and secure the buoyant toothed roller 10 to the flotation structure 30. Preferably, the mating mechanism 19 and the support 20 are made of one or several combined materials which are adapted to marine applications, either fresh or salt water.

Propelling the Watercraft

Figure 9:
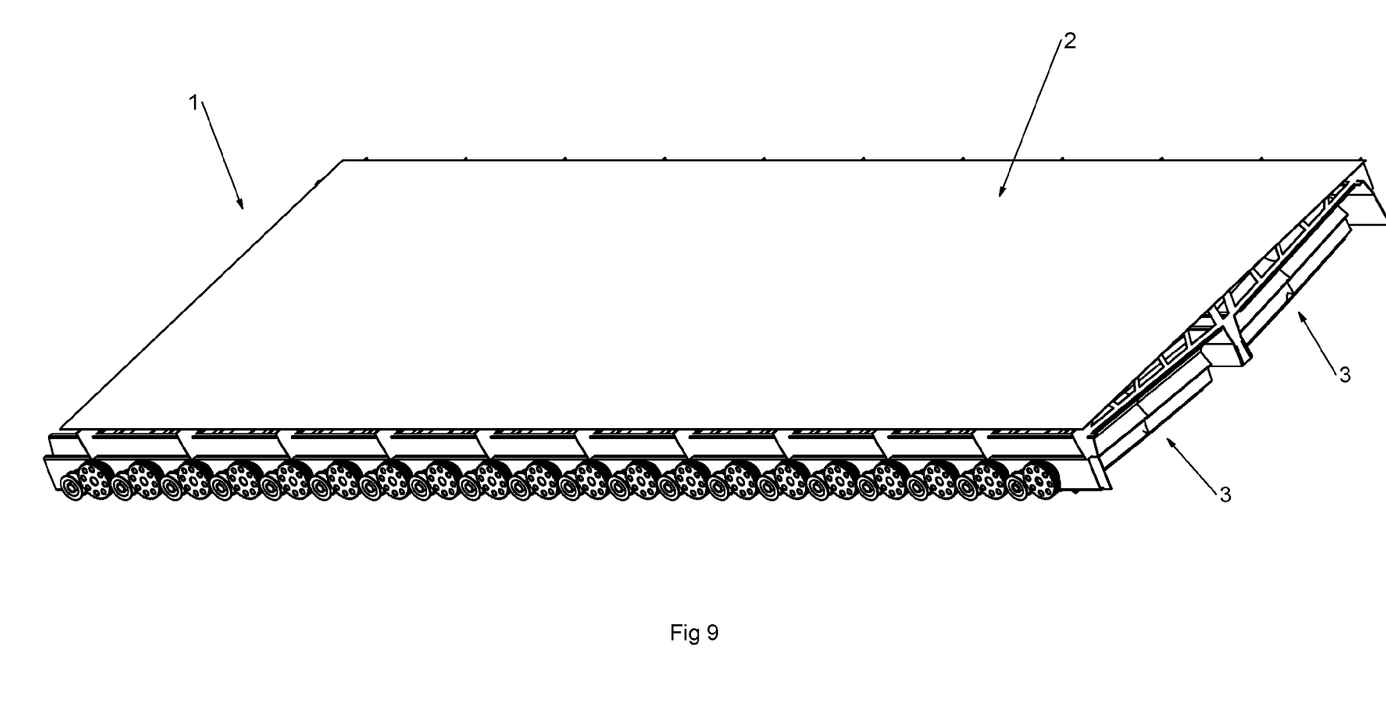
FIG. 9 is a perspective view of the present flotation structure affixed to a hull, and wherein the buoyant toothed rollers are equipped with the support.

Reference is mow made to FIGS. 9 and 10, where FIG. 9 is a perspective view of the present flotation structure affixed to a hull, and wherein the buoyant toothed rollers are equipped with the support 20, and FIG. 10 is an enlarged perspective view of area Z of FIG. 9.

On FIGS. 9 and 10, the buoyant toothed rollers 10 are secured to the flotation structure 30 through their respective mating mechanism 21 and support 20. In the example shown on FIGS. 9 and 10, the buoyant toothed rollers 10 are rotating freely with respect to the flotation structure 30. By affixing an engine (not shown), such as for example an outboard, an inboard or a water turbine, to the watercraft 1, the watercraft is thereby propelled into motion, and the buoyant toothed rollers 10 rotate freely under the hull 2. For simplicity purposes, the hull 2 shown on FIG. 9 is flat, but as previously mentioned, the present watercraft 1 is not limited to such an implementation and type of hull 2. Furthermore, in order to simplify the present description, the example shown on FIG. 9 represents two longitudinal sections 3, but as previously mentioned, the present watercraft 1 is not limited to such an implementation.

Thus, in this example, when the engine propels the watercraft 1, the buoyant toothed rollers 10 rotate freely upon movement of the watercraft 1 on the water.

In another example, some or all the support mechanisms 20 of one of the longitudinal sections 3 further comprise the gear wheel 22. The gear wheels 22 of consecutive buoyant toothed rollers 10 of one longitudinal section 3 are interlinked to rotate simultaneously. The gear wheels 22 of the consecutive buoyant toothed rollers 10 of the longitudinal section 3 may be interlinked by means of a chain or belt (not shown for simplicity purposes). The chain or belt interlinking the gear wheels 22 is propelled by an engine. Thus instead of propelling movement of the watercraft 1 through an inboard, outboard or water turbine, the watercraft 1 is propelled by means of an onboard engine which is engaged directly or indirectly with the chain interlinking the gear wheels 22 of the consecutive buoyant toothed rollers 10 of the corresponding longitudinal section 3. To maintain alignment of the chain or belt interlinking the gear wheels 22, pulleys may be used between consecutive gear wheels 22. Alternatively, the gear wheels 22 may be interlinked by means of a coupling rod and a link, as well known in trains.

In a particular example, the watercraft 1 comprises two longitudinal sections 3, where each longitudinal section 3 covers a length of the hull 2. In this particular example, the gear wheels 22 of consecutive buoyant toothed rollers 10 of each longitudinal section 3 are interlinked (either by means of a chain or a coupling rod and link, or any known means of propelling a series of rolls) in such a manner that each longitudinal section 3 is propelled by the onboard engine independently of the other longitudinal section 3. In this particular example, the watercraft 1 may further comprise a transmission, to independently propel the buoyant toothed rollers 10 of each longitudinal section 3 separately. Furthermore, as each longitudinal section 3 is controlled and its buoyant toothed rollers 10 propelled independently, a pilot of the watercraft can steer the watercraft by independently actuating propelling of each longitudinal section 3 independently of the other longitudinal section.

Other examples of longitudinal sections 3 and propelling thereof could be used as well. For example, the flotation structure 30 could comprise three contiguous longitudinal sections 3, where the buoyant toothed rollers 10 of the longitudinal sections 3 along the sides of the watercraft 1 are propelled and the buoyant toothed rollers 10 of the longitudinal section 3 in between freely rotates.

Another example comprises two front longitudinal sections 3 and two rear longitudinal sections 3. In such an example, the buoyant toothed rollers 10 of the longitudinal sections 3 at the front may be propelled while the buoyant toothed rollers 10 of the longitudinal sections 3 at the back freely rotates.

Alternately, and/or depending on the application for which the watercraft 1 is destined, multiple combinations of freely rotating and propelled buoyant toothed rollers 10 could be combined on one or multiple longitudinal sections.

Options of the Watercraft

The watercraft 1 may further comprise a rudder (not shown) as well known in the art. The rudder could be used to steer the watercraft alone or in combination with the motor. The watercraft could alternately be steered by using an outboard with steering capabilities, or by using two engines, generators or turbines each propelling independently a different longitudinal section.

Although not shown on the Figures for clarity purposes, the present watercraft could comprise any of the following: a deck, seats, sides, a windshield, a nose, an anchor, a lighting system, a communication system, as well as any other component well known in the boating industry.

As the present watercraft 1 produces a very low water displacement compared to similar watercrafts, a smaller engine than on a similar watercraft can be used. This advantage is quite important, as smaller engines require less energy (either gas, fuel or electricity) to move the watercraft at the same speed as a similar watercraft not equipped with the present flotation structure.

To facilitate displacement of the watercraft from one water plan to another, the watercraft may further be equipped with a mechanism for receiving wheels or a trailer directly under the flotation structure. The buoyant toothed rollers 10 facilitate the mounting of the watercraft 1 on a trailer. Other options known in the boating industry could further be added to the watercraft 1.

Although not specifically described, the watercraft 1 could further be equipped with any other component well known in the marine industry. For example, depending on the materials used for the flotation structure 30 and mating mechanism 21 and support 20, one or several sacrificial anodes may be installed along the flotation structure 30 to prevent the effect of corrosion.

Although the present watercraft has been described hereinabove by way of non-restrictive, illustrative embodiments thereof, these embodiments may be modified at will within the scope of the appended claims without departing from the spirit and nature of the present disclosure.

What is claimed is:

1. A watercraft comprising:
    a hull; and
    a flotation structure protruding under the hull, the flotation structure retaining a plurality of buoyant toothed rollers, each buoyant toothed roller being substantially parallel to a beam of the hull and being rotationally retained by the flotation structure,
    wherein each tooth of the buoyant toothed rollers comprises a rise and a fall, the rise being shorter than the fall, the fall being inwardly curved towards a center of the buoyant toothed roller, and each buoyant toothed roller rotates in a direction where the fall of each tooth is presented before the rise of each tooth.

2. The watercraft of claim 1, wherein the flotation structure protrudes along at least 90% of a length over water of the hull.

3. The watercraft of claim 1, wherein the hull is shaped as one of the following: a platform, a boat, and a vessel.

4. The watercraft of claim 1, wherein the buoyant toothed rollers are interlinked to rotate simultaneously.

5. The watercraft of claim 4, wherein the plurality of buoyant toothed rollers are interlinked by means of a belt.

6. The watercraft of claim 5, further comprising an engine to propel movement of the watercraft.

7. The watercraft of claim 1, wherein the flotation structure supports the plurality of buoyant toothed rollers in two longitudinal sections along a length overall of the hull.

8. The watercraft of claim 7, wherein the plurality of buoyant toothed rollers of each longitudinal section are interlinked to rotate simultaneously.

9. The watercraft of claim 1, wherein teeth of the buoyant toothed rollers are asymmetrical along a circumference of the buoyant toothed rollers.

\* \* \* \* \*